Aug. 24, 1943.    T. S. PENDERGAST    2,327,737
AIR CONDITIONING APPARATUS
Filed March 5, 1941    3 Sheets-Sheet 1
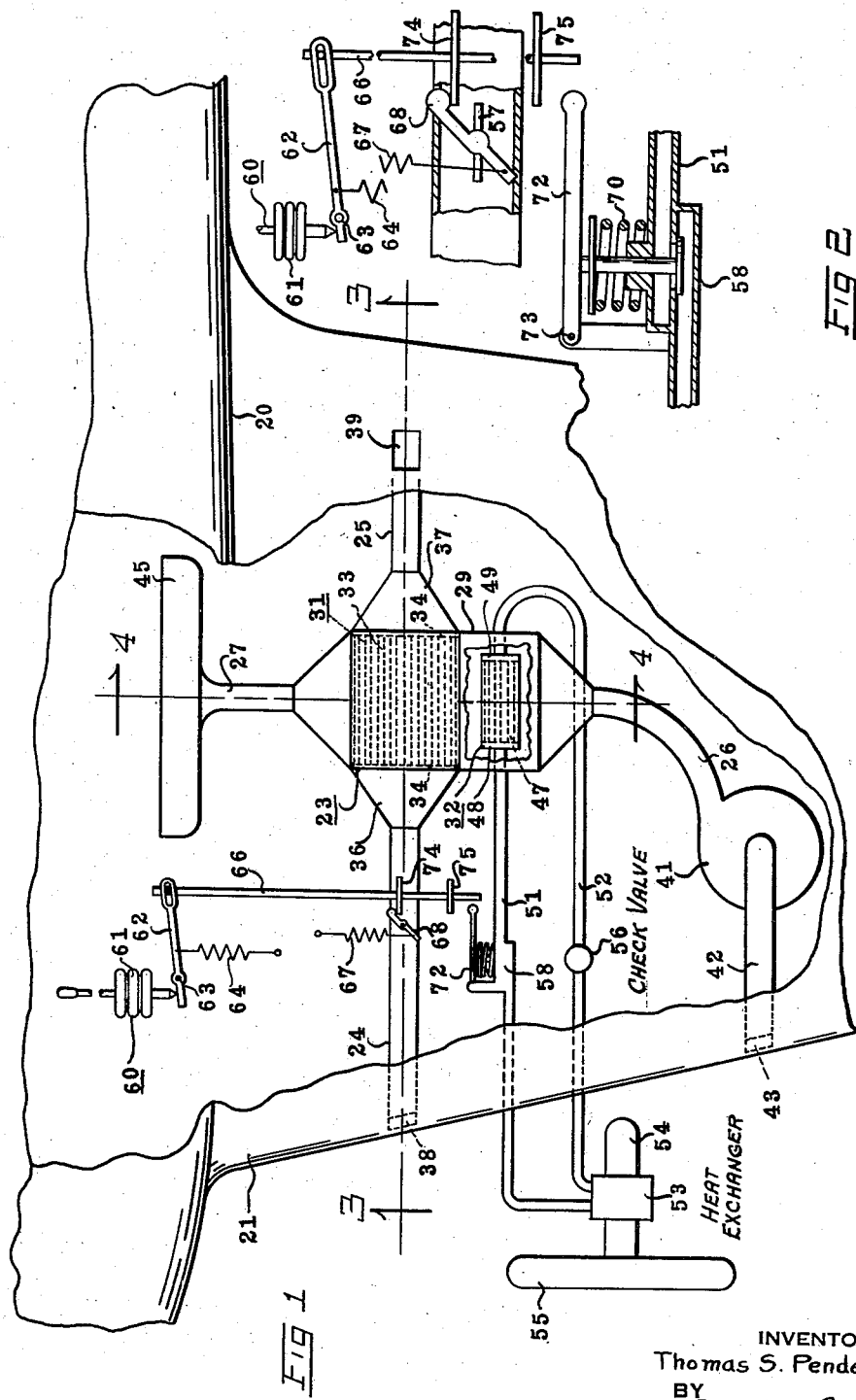
INVENTOR
Thomas S. Pendergast
BY
ATTORNEY

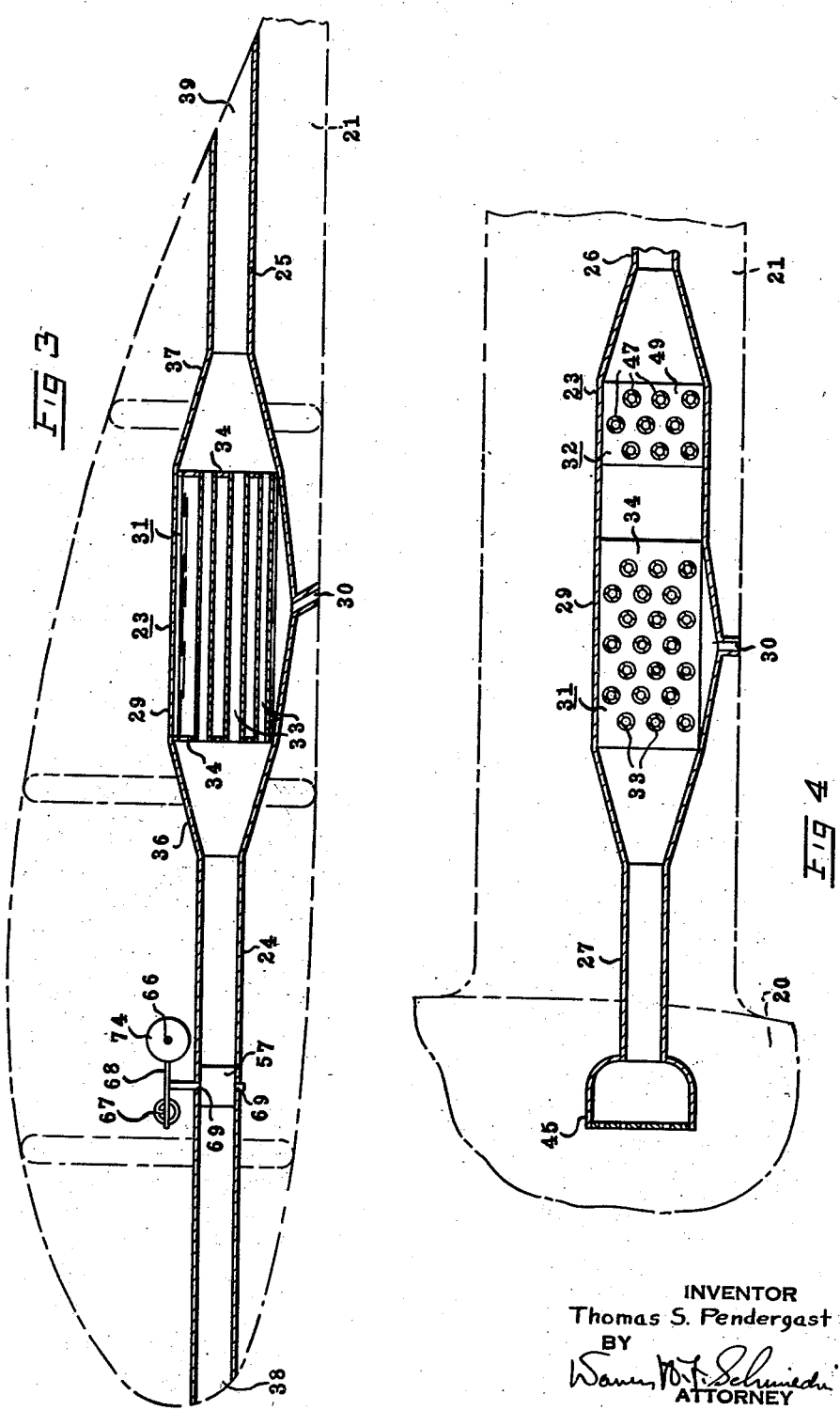

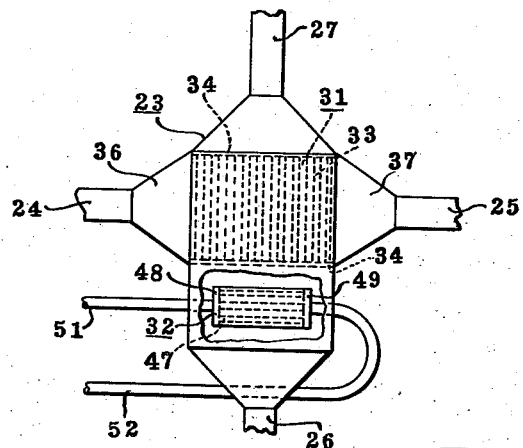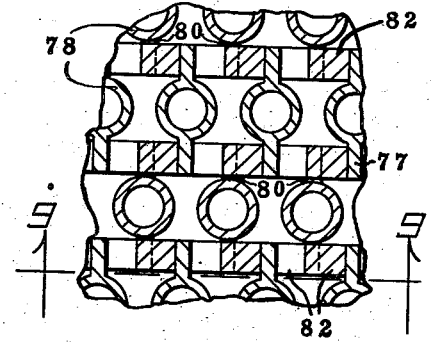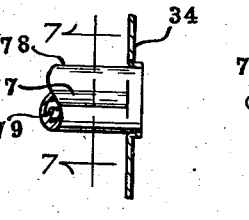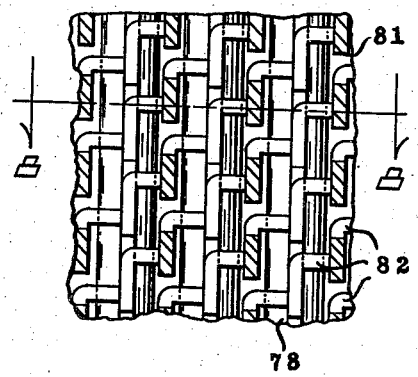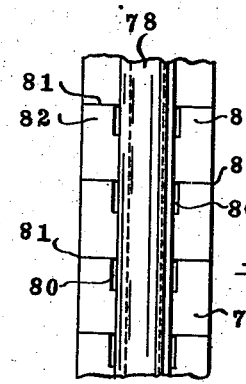

Patented Aug. 24, 1943

2,327,737

UNITED STATES PATENT OFFICE 2,327,737

AIR CONDITIONING APPARATUS

Thomas S. Pendergast, Marion, Ohio, assignor to Universal Cooler Corporation, a corporation of Michigan Application March 5, 1941, Serial No. 381,834

5 Claims. (Cl. 244—118)

The present invention relates to apparatus for maintaining the desired temperature and pressure within an inclosure and is particularly applicable for maintaining the desired temperature and pressure conditions in the passenger cabin of a flying machine which is subjected to relatively low environment air pressure and temperature.

It is the general practice, when an airplane is flying at a high altitude, to force outside air into the cabin of the airplane to maintain the pressure therein at substantially ground air pressure. This often causes discomfortable conditions because of varying environment pressure and temperature conditions at the high altitude. Under certain conditions, the temperature of the air in the cabin will be too warm when the air is compressed to substantially the same air pressure that exists at ground level, and, under certain conditions, the air in the cabin will be too cool.

Since space is highly valuable in an airplane and weight an excess burden, any air conditioning apparatus must be reduced to the minimum size and weight possible.

One of the objects of the present invention is to provide an air conditioning apparatus that can be mounted inside an available space, which is ordinarily not used, as for example, one of the aerofoils of the airplane.

Another object of the present invention is to dispose the heat exchanger, of an air conditioning apparatus in a wing of the airplane and provide a passage for air through the wing and exchanger, which passage is so arranged that the air flows therethrough due to the forward movement of the airplane.

Another object of the present invention is to control the rate of heat exchange between the heat interchanger and the compressed air flowing to the cabin in accordance with the temperature of the air in the cabin. In carrying out this object, it is a further object to vary the flow of cooling air for the heat exchanger in accordance with the temperature of the air in the cabin.

Under certain atmospheric conditions, the compressing of the air to a pressure substantially equal to the air pressure at the ground does not increase the temperature thereof to a comfortable temperature in which case the air temperature must be further increased by a heater. It is a still further object of the present invention to embody the heater in the duct system within the wing of the airplane.

Still another object of the present invention is to control both the cooling and heating of the air by controlling the flow of cooling air for the heat exchanger and by controlling the temperature of the heater.

Other and further objects and advantages will be apparent from the following description, reference being had to the accompanying drawings wherein preferred forms of embodiments of the present invention are clearly shown.

In the drawings:

Fig. 1 is a fragmentary top plan view of an airplane wing and cabin, partly in section, showing the improved air conditioning apparatus, certain parts of the apparatus being shown diagrammatically;

Fig. 2 is a view partly diagrammatic and partly sectional of control mechanism of the apparatus;

Figs. 3 and 4 are sectional views of the air conditioning apparatus and showing the airplane wing by dot and dash lines, the sections of the air conditioning apparatus being taken on lines 3—3 and 4—4 of Fig. 1, respectively;

Fig. 5 is a fragmentary view of the air conditioning apparatus shown in Fig. 1, but showing a different arrangement of parts of a heat exchanger;

Fig. 6 is a fragmentary view of one of the tubes and an end plate of one of the heat exchangers, parts thereof being shown in section;

Fig. 7 is a sectional view taken on line 7—7 of Fig. 6;

Fig. 8 is a fragmentary sectional view of a different form of heat exchanger, the section being taken on line 8—8 of Fig. 9;

Fig. 9 is a fragmentary view of the heat exchanger shown in Fig. 8, the section being taken on line 9—9 thereof; and, Fig. 10 is a fragmentary view in elevation of one of the tubes shown in Figs. 8 and 9.

Referring to the drawings, fragments of a passenger compartment or cabin and an aerofoil are shown at 20 and 21, respectively. This aerofoil 21, herein illustrated as a wing, is hollow and a heat exchange apparatus 23 and air ducts 24, 25, 26, and 27 are suitably supported therein. The heat exchange apparatus 23 includes a casing 29, the front of which is connected with an air inlet duct 24, the rear with an air outlet duct 25, and the opposite sides with air inlet and outlet ducts 26 and 27. Casing 29 houses two heat exchangers 31 and 32.

Heat exchanger 31 includes a bank of tubes 33 having the opposite ends thereof connected with end plates 34. The edges of end plates 34 are connected with the casing 29 in such manner that the tubes extend longitudinally of the line of flight of the airplane. The casing 29, from the joints of the end plates, is tapered inwardly, forwardly at the front and inwardly, rearwardly at the back and is joined with the ducts 24 and 25. The front and rear tapered portions of casing 29 are shown at 36 and 37 respectively. The bottom wall of casing 29 is depressed beneath the exchanger 31 to form a receiver for moisture which may be condensed out of the air passing through the exchanger. A drain 30 extends from this depressed wall downwardly and through the lower surface of wing 21 for conducting water, which collects in the depressed portion, out of the duct system. The inlet 38 of duct 24 is at the front of wing 21 or pressure side and the outlet 39 of duct 25 is at the top, rear of the wing, that is, on the low pressure side of the wing. Thus, while the airplane is moving in normal flight, there is a constant change of air in the tubes.

Opposite sides of case 29 are tapered inwardly and joined with ducts 26 and 27. Duct 26 is connected with the outlet of a supercharger 41. The inlet of the supercharger 41 is connected with the outlet end of a duct 42; the inlet 43 of duct 42 is at the front of the wing 21. The supercharger 41 and duct 42 are suitably supported within the hollow wing. The outlet end of duct 27 is connected with the interior of cabin 20 through an air distributing manifold 45.

The second heat exchanger 32, in the form of a heater, is also disposed in casing 29, it being interposed between the outlet of duct 26 and the exchanger 31. The heater 32 is preferably of the hot water or steam type and includes a bank of tubes 47 having the opposite ends thereof connected with headers 48 and 49. These headers 48 and 49 are connected, respectively, with pipes 51 and 52 leading to and from a heat exchanger 53. Heat exchanger 53 surrounds the exhaust pipe 54 leading from the exhaust manifold 55 of one of the propelling engines (not shown). Pipe 52 is equipped with a suitable check valve 56 to permit the flow of steam or hot water through the heater 32 in one direction only.

Air entering the duct 42 is compressed by the supercharger 41 and is forced by the supercharger through duct 26 into the casing 29. Part of the air passes about the tubes 47 of heater 32 and part passes around this heater. After passing through and about the heater 32, the air passes about the tubes 33 of heat exchanger 31 and then through duct 27 into manifold 45 whence it is distributed within the cabin 20. The flow of air into the cabin through manifold 45 should be controlled so as to maintain the air pressure within the cabin at approximately the same pressure as the air at the level of the ground. This flow of air can be controlled in any suitable manner as, for example, by controlling the speed of the supercharger 41 or, for example, by controlling the air flow in the air duct by a damper or dampers (not shown) in the outlets of the manifold.

Under certain atmospheric conditions, the air when compressed by the supercharger 41 to the pressure of the air at the level of the ground will be at too high a temperature for comfort. Under these conditions, the heat for the air for the cabin 20 is transferred to the air passing through the tubes 33 of the heat exchanger 31. The rate of heat exchange is controlled by a damper 57 disposed in either the duct 24 or 25; in the present illustration this damper 57 is within duct 24, and functions as a shut-off valve as well as an air flow regulating valve.

Under other atmospheric conditions, it is necessary to increase the temperature of the air flowing to the cabin. Under certain conditions, the increase in temperature, due to increase of pressure may not warm the air to a comfortable temperature. Under these conditions, the damper 57 will be closed and the heater 32 will be rendered operative. The temperature of the heater 32 is controlled by a valve 58 in pipe 51. This valve 58 may be used as a shut-off valve as well as a flow regulating valve.

The damper 57 and valve 58 are controlled preferably automatically by the temperature of the air within the cabin 20. The rate of cooling of the air is controlled by regulating the position of the damper 57 and the rate of heating or boosting of the temperature of the air is controlled by regulating the opening of the valve 58. The damper 57 and valve 58 may each be provided with a thermostat but in the preferred embodiment only one thermostat 60 is provided for both. This thermostat 60 may be any approved type and in the present illustration it includes a bellows 61, containing an expansible fluid and disposed within the cabin 20.

Bellows 61 expands and contracts with increases and decreases in temperature within the cabin and is arranged to actuate a lever 62 which is pivotally mounted at 63. A spring 64 is arranged to exert a force counter to the expanding force of the bellows. Lever 62 actuates a rod or wire 66 which in turn actuates the damper 57 and the valve 58. A spring 67 normally tends to close the damper 57 and the damper is moved to open position by a lever 68 pivoted at 69. Likewise, a spring 70 normally tends to close valve 58 and the valve is moved to open position by a lever 72 pivoted at 73. The rod 66 slides freely through bearings (not shown) and is provided with two abutments 74 and 75 which engage, respectively, levers 68 and 72. These abutments 74 and 75 are so spaced that upon contraction of the bellows 61, the abutment 75 will not engage lever 72, until the abutment 74 has moved away from lever 68, at which time, the damper 57 is closed, and, upon expansion of the bellows 61, the abutment 74 will not engage lever 68 until the abutment 75 has moved away from lever 72, at which time, the valve 58 is closed. Thus, as the temperature within the cabin decreases, the damper 57 will gradually close and will continue to close as long as the temperature in the cabin continues to decrease. If the temperature of the air within the cabin continues to decrease although the damper 57 has closed completely, the valve 58 will be opened gradually to permit sufficient heating fluid to flow therethrough to heat the incoming air for the cabin to the necesary temperature. If now the temperature of the air in the cabin is above a predetermined maximum, at the time that the heater 32 is ineffective, the bellows will first permit the valve 58 to close and then it will gradually open the damper 57 until sufficient cooling air passes through the tubes 33 of heat exchanger 31 to cool the incoming air, passing to the cabin, to the necesary temperature The ducts, pipes, tubes, headers and casing are formed of light weight material such as aluminum. The tubes 33 and 47 may be extruded into the shape shown in Fig. 7 and disposed so that the web portions 77 project from the tubing portion 78 in a direction longitudinally with respect to the main direction of air flow, that is, the air first strikes the leading edge of one web portion of a tube, then flows over the tube portion and from the tube portion, it flows over the opposite web portion of the tube. These tubes may be provided with internal fins 79. The tubes may also be cylindrical as shown in Fig. 3.

Tubes 33 are suitably secured in pierced staggered openings in aluminum end plates 34, and opposite ends of tubes 47 are suitably sealed in staggered openings in the confronting walls of headers 48 and 49 of heater 32.

If desirable, instead of causing the cooling air, for exchanger 31, to pass through tubes 33 or 78 and causing the compressed air to pass about these tubes, tubes 33 or 78 can be arranged transversely of the line of flight, as shown in Fig. 5, in which case, the air flowing from the supercharger 41 will flow through tubes 33 or 78 and the cooling air from duct 24 will pass about these tubes.

Fragments of a desirable form of heat exchanger are shown in Figs. 8 and 9. In this embodiment, the tubes are formed of extruded material such as aluminum. The tube, from which the tube sections are severed, includes integral webs and fins which are extruded simultaneously with the tube. The webs are then pierced, at spaced intervals, longitudinally thereof and immediately adjacent, the tube proper as shown in Fig. 10 wherein the numeral 80 indicates the pierced slot, and are severed, at spaced intervals, transversely of the length thereof as shown at 81 in Fig. 10. The sections 82 of the webs, which were severed by the piercing and the other severing operations, can then be bent outwardly. These sections, not only function as extended surfaces for the tubes between the tubes but also as spacers for the tubes.

In the preferred embodiment, the heater 32 is interposed between the outlet of the supercharger duct 26 and the heat exchanger 31. Under certain atmospheric conditions, moisture from the cooling air passing through the exchanger 31 will condense and freeze in or about the tubes 33 or 78. This ice will or will tend to clog the exchanger. To prevent this formation of ice, or to remove the ice, the heating effect of the heater can be initiated or increased by manipulating the rod 66, in which case, the warmer air, passing through or about the tubes, will cause the ice to melt or prevent the accumulation thereof, as the case may be.

Although only one air conditioning apparatus is shown, it is to be understood that a similar air conditioning apparatus may be installed on the opposite side of the cabin.

From the foregoing, it is immediately apparent that there is provided a relatively simple, compact, efficient and light weight air conditioning apparatus which can be installed in a less valued space of an airplane, namely in an aerofoil, and, that positive circulation of air about the exchanger 31 is assured, while the airplane is in flight.

A desirable temperature can be maintained at all times although the air for the cabin is compressed to the pressure of the air at ground level by controlling the flow of cooling air for the cabin incoming air and by controlling the flow of fluid to the heater.

While the forms of embodiments of the present invention as herein disclosed constitute preferred forms, it is to be understood that other forms might be adopted, all coming within the scope of the claims which follow.

I claim:

1. In combination, an aircraft having a cabin and a hollow section; a heat exchanger in said section and having a passage therethrough and an air inlet and an air outlet; duct means passing through the hollow section and heat exchanger; duct means forming another passage through the heat exchanger separate from the first mentioned passage, said second mentioned duct means leading from the exterior of the airplane to the interior of the cabin; compressing means for forcing air through the second mentioned passage and into the interior of the cabin; a second heat exchanger in the second mentioned passage; and means responsive to the temperature within the cabin for controlling the rate of heat exchange between the second heat exchanger and the air passing through the second mentioned passage.

2. In combination, an aircraft having a cabin and a hollow section; a heat exchanger in said section and having a passage therethrough and an air inlet and an air outlet; duct means passing through the hollow section and heat exchanger; duct means forming another passage through the heat exchanger separate from the first mentioned passage, said second mentioned duct means leading from the exterior of the airplane to the interior of the cabin; compressing means for forcing air through the second mentioned passage and into the interior of the cabin; a second heat exchanger in the second mentioned passage; and means responsive to the temperature within the cabin for controlling the rate of heat exchange between the air passing through the second mentioned passage and the first mentioned heat exchanger and for controlling rate of heat exchange between the second heat exchanger and the air passing through the second mentioned passage.

3. In combination, an aircraft having a cabin and an aerofoil; means forming a plurality of fluid passages on the inside of the aerofoil, said passages having sections thereof in heat exchange relation with one another, one of said passages having an opening at the forepart of the aerofoil and leading into the cabin; means for forcing air through said one passage and into the cabin, a second of said fluid passages having an inlet at the forepart of the aerofoil and an outlet rearwardly of the forepart of the aerofoil; means forming a third fluid passage, a portion of said third passage being in heat exchange relation with a portion of said one passage; means for passing a heating fluid through said third passage; and means for controlling the flow of fluid through the said second passage.

4. In combination, an aircraft having a cabin and an aerofoil; means forming a plurality of fluid passages on the inside of the aerofoil, said passages having sections thereof in heat exchange relation with one another, one of said passages having an opening at the forepart of the aerofoil and leading into the cabin; means for forcing air through said one passage and into the cabin, a second of said fluid passages having an inlet at the forepart of the aerofoil and an outlet rearwardly of the forepart of the aerofoil; means forming a third fluid passage, a portion of said third passage being in heat exchange relation with a portion of said one passage; means for passing a heating fluid through said third passage; and means for controlling the flow of fluid through said third passage.

5. In combination, an aircraft having a cabin and an aerofoil; means forming a plurality of fluid passages on the inside of the aerofoil, said passages having sections thereof in heat exchange relation with one another, one of said passages having an opening at the forepart of the aerofoil and leading into the cabin; means for forcing air through said one passage and into the cabin, a second of said fluid passages having an inlet at the forepart of the aerofoil and an outlet rearwardly of the forepart of the aerofoil; means forming a third fluid passage, a portion of said third passage being in heat exchange relation with a portion of said one passage; means for passing a heating fluid through said third passage; and means responsive to temperature changes in the cabin for causing an increase in flow of fluid through said second passage and causing a decrease in flow of fluid through said third passage when the temperature in the cabin increases above a predetermined temperature.

THOMAS S. PENDERGAST.